(12) United States Patent
Nishimura (10) Patent No.: US 9,632,258 B2
(45) Date of Patent: Apr. 25, 2017

(54) OPTICAL CONNECTOR FERRULE

(71) Applicant: FUJIKURA LTD., Tokyo (JP)

(72) Inventor: Akito Nishimura, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/076,059

(22) Filed: Mar. 21, 2016

(65) Prior Publication Data

US 2016/0282568 A1    Sep. 29, 2016

(30) Foreign Application Priority Data

Mar. 25, 2015   (JP) ................................. 2015-062342

(51) Int. Cl.
G02B 6/36 (2006.01)
G02B 6/38 (2006.01)

(52) U.S. Cl.
CPC ......... *G02B 6/3885* (2013.01); *G02B 6/3814* (2013.01); *G02B 6/3834* (2013.01); *G02B 6/3837* (2013.01); *G02B 6/3873* (2013.01); G02B 6/3861 (2013.01)

(58) Field of Classification Search
CPC .. G02B 6/3885; G02B 6/3814; G02B 6/3834; G02B 6/3873
USPC .................................................... 385/53–94
See application file for complete search history.

(56) References Cited

U.S. PATENT DOCUMENTS

| | | | | |
|---|---|---|---|---|
| 5,422,971 A * | 6/1995 | Honjo | .................. | G02B 6/3861 385/139 |
| 5,975,770 A * | 11/1999 | Yanagi | .................. | B29C 45/261 385/78 |
| 6,719,927 B2 * | 4/2004 | Sakurai | ................ | G02B 6/3885 249/176 |
| 7,862,244 B2 * | 1/2011 | Mizue | ...................... | G02B 6/42 385/92 |
| 8,123,417 B2 * | 2/2012 | Wertman | ............. | G02B 6/3869 385/60 |
| 8,469,605 B2 * | 6/2013 | Wertman | ............. | G02B 6/3869 385/60 |
| 2009/0092362 A1 * | 4/2009 | Mizue | .................. | G02B 6/4292 385/92 |
| 2010/0303422 A1 * | 12/2010 | Wertman | ............. | G02B 6/3869 385/79 |

(Continued)

FOREIGN PATENT DOCUMENTS

| | | |
|---|---|---|
| JP | 1-125409 U | 8/1989 |
| JP | 4-98207 A | 3/1992 |
| JP | 8-338925 A | 12/1996 |

*Primary Examiner* — Ryan Lepisto
*Assistant Examiner* — Guy Anderson
(74) *Attorney, Agent, or Firm* — Sughrue Mion, PLLC (57) ABSTRACT

Disclosed is an optical connector ferrule including a main body portion having inside a plurality of optical paths that are parallel that are to each other; and a reinforcing member having a face parallel to an alignment direction of the plurality of the optical paths and having a linear expansion coefficient that is smaller than the linear expansion coefficient of the main body portion, wherein the reinforcing member has on a face of the optical path side thereof at least two limiting portions each having a face that limits an expansion and a contraction of the main body portion in the arrangement direction, the limiting portions being spaced apart in the arrangement direction.

6 Claims, 9 Drawing Sheets

(56) References Cited

U.S. PATENT DOCUMENTS

| | | | | |
|---|---|---|---|---|
| 2012/0294573 A1* | 11/2012 | Kadar-Kallen | ...... | G02B 6/3869 385/79 |
| 2013/0019452 A1* | 1/2013 | Wertman | ............. | G02B 6/3869 29/447 |
| 2013/0272660 A1* | 10/2013 | Grinderslev | ......... | G02B 6/3869 385/79 |

* cited by examiner

OPTICAL CONNECTOR FERRULE

CROSS-REFERENCE TO RELATED APPLICATION

The present application claims the benefit of priority pursuant to 35 U.S.C. §119(a) to Japanese Patent Application No. 2015-062342, filed on Mar. 25, 2015, the entire disclosure of which is hereby incorporated herein by reference.

BACKGROUND

Technical Field

Embodiments of this disclosure generally relate to an optical connector ferrule.

Related Art

Japanese Patent Application Laid-open Publication No. 8-338925 (hereinafter, JP-A-8-338925) discloses embedding a reinforcing member made of refractory metal with a linear expansion coefficient smaller than that of a resin molding in order to prevent axes misalignment of the optical fiber holes (optical fiber insert holes) due to contraction of the optical connector ferrule that is a resin molding. The reinforcing member in JP-A-8-338925 is disposed to enclose a plurality of the optical fiber holes.

Additionally, Japanese Patent Application Laid-open Publication No. 4-98207 (hereinafter, JP-A-4-98207) and Japanese Utility Model Application Unexamined Publication No. 1-125409 (hereinafter, JP-UM-A-1-125409) also discloses disposing a reinforcing member in a manner so as to enclose a plurality of optical fiber holes.

When the plurality of the optical fiber holes are just enclosed with a reinforcing member as has been done so with the reinforcing members disclosed in JP-A-8-338925, JP-A-4-98207, and JP-UM-A-1-125409, there is a possibility that the inner resin and the reinforcing member would be separated when the resin inside contracts. And when the inner resin and the reinforcing member is separated, the optical fiber holes which act as the optical paths would be misaligned causing a possibility in an increase in transmission loss.

It is therefore an objective of the present invention to suppress misalignment of the optical paths with a reinforcing member.

SUMMARY

The present invention is directed to an optical connector ferrule including a main body portion having inside a plurality of optical paths that are parallel to each other, and a reinforcing member having a face parallel to an alignment direction of the plurality of the optical paths and having a linear expansion coefficient that is smaller than the linear expansion coefficient of the main body portion, wherein the reinforcing member has on a face of the optical path side thereof at least two limiting portions each having a face that limits an expansion and a contraction of the main body portion in the alignment direction, the limiting portions being spaced apart in the alignment direction.

Other features of the present invention will become apparent from the following descriptions of the present specification and of the accompanying drawings.

According to the present invention, misalignments of the optical paths can be suppressed with a reinforcing member.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION

At least the following details will become apparent from the description of this specification and of the accompanying drawings.

An optical connector ferrule including: a main body portion having inside a plurality of optical paths that are parallel that are to each other; and a reinforcing member having a face parallel to an alignment direction of the plurality of the optical paths and having a linear expansion coefficient that is smaller than the linear expansion coefficient of the main body portion, wherein the reinforcing member has on a face of the optical path side thereof at least two limiting portions each having a face that limits an expansion and a contraction of the main body portion in the alignment direction, the limiting portions being spaced apart in the alignment direction. will be made apparent.

According to such an optical connector ferrule, expansion and the contraction in the alignment direction of the main body portion can be suppressed and thus increase in transmission loss can be suppressed.

It is preferable that the optical connector ferrule further includes two of the reinforcing members, wherein the two reinforcing members are disposed opposing each other and sandwiching the plurality of the optical paths. Hereby, curving of the main body portion can be suppressed.

It is preferable that the two limiting portions of the reinforcing member are disposed, on an outer side along the alignment direction with respect to the plurality of the optical paths, and are spaced apart with a space wider than a width of the plurality of the optical paths in the alignment direction. Hereby, misalignment of the optical path can be suppressed.

It is preferable that the limiting portion is a protruding portion that is protruding out from the face on the optical path side of the reinforcing member. Hereby, the reinforcing member can be formed thin.

It is preferable that the optical path is an optical fiber hole that has optical fiber inserted. Hereby, the misalignment of the optical fiber holes which act as the optical paths can be suppressed.

It is preferable that the optical path is a section that has optical signals pass therethrough in the main body portion. Hereby, the misalignment of the sections which act as the optical paths can be suppressed.

First Embodiment

Figure 1:
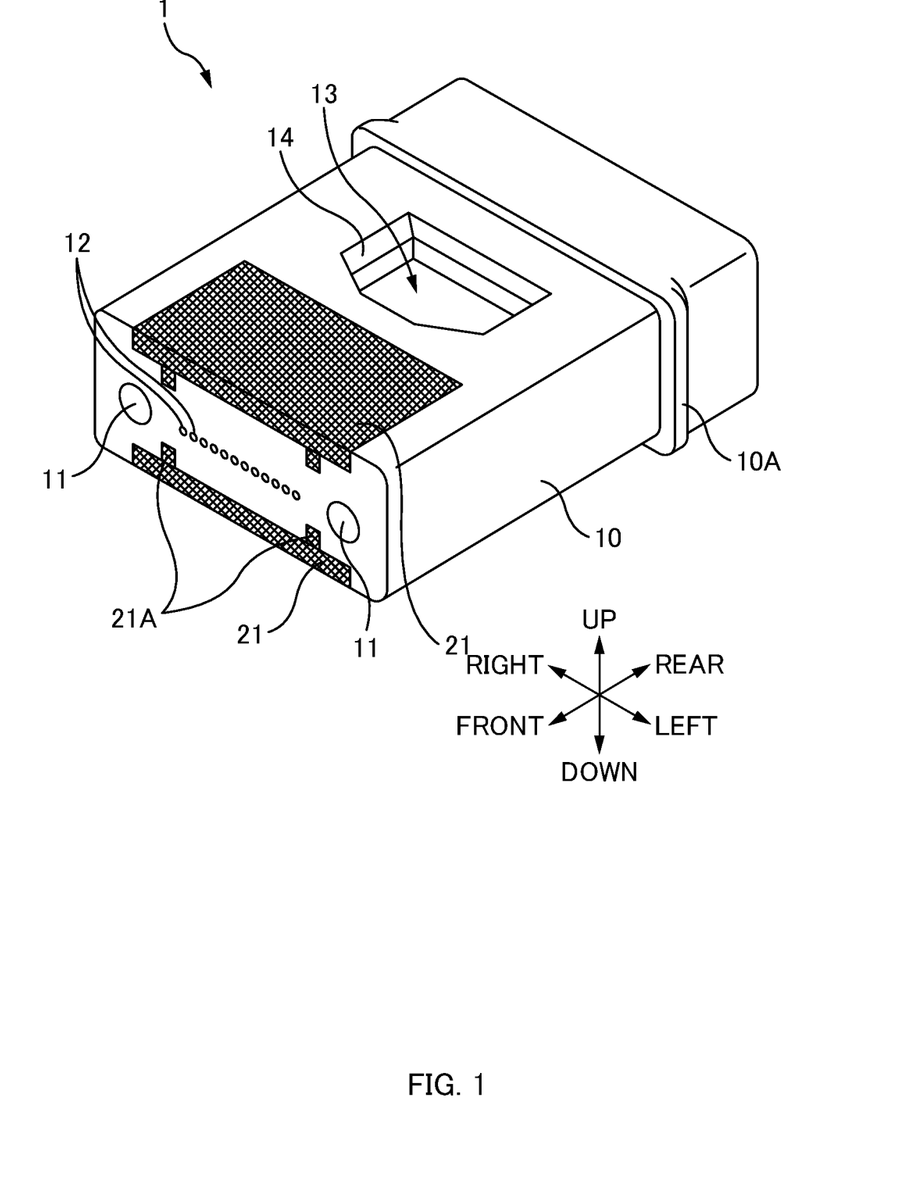
FIG. 1 is a perspective view of an optical connector ferrule 1 according to a first embodiment of the present invention.
Figure 2A:
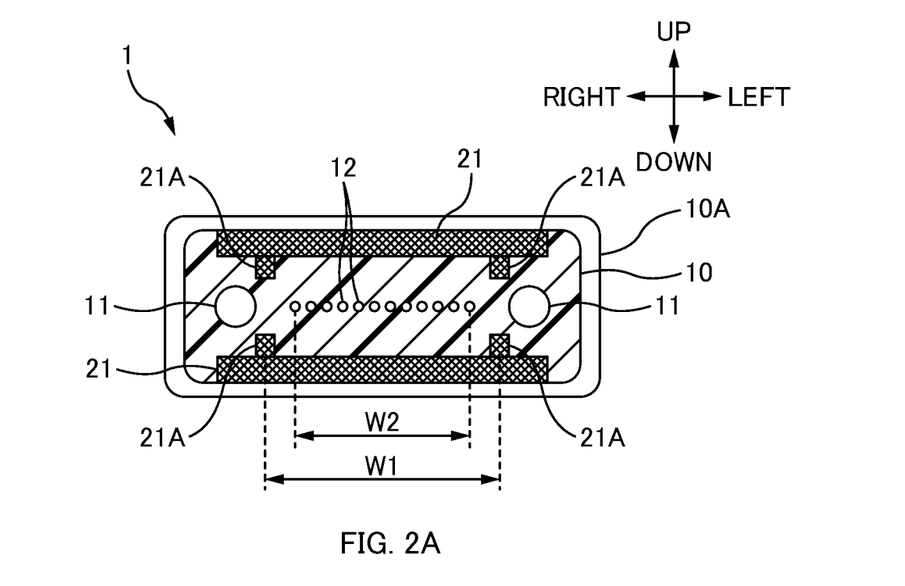
FIG. 2A and FIG. 2B are sectional views of the optical connector ferrule 1 according to the first embodiment.
Figure 2B:
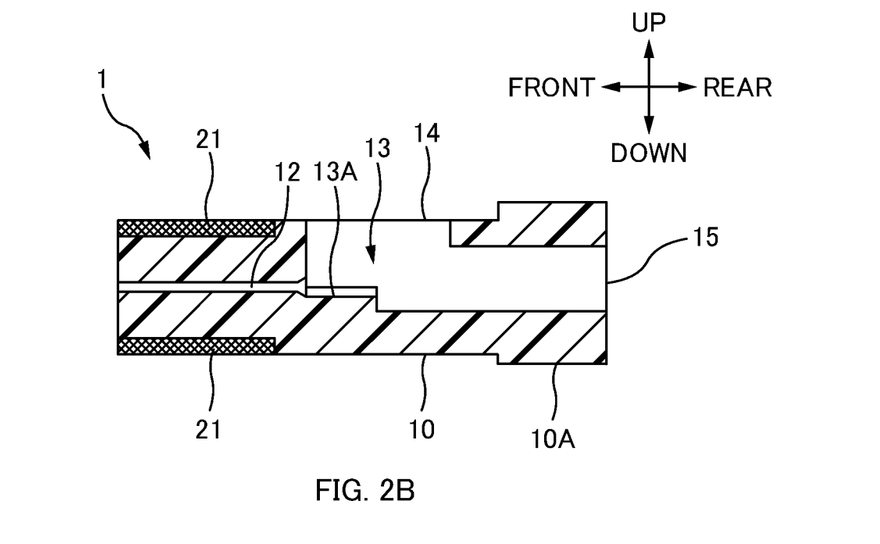

FIG. 1 is a perspective view of an optical connector ferrule 1 according to the first embodiment. FIG. 2A and FIG. 2B are sectional views of the optical connector ferrule 1 according to the first embodiment. The optical connector ferrule 1 according to the first embodiment is an MT connector equivalent to the F12 type multi-core optical fiber connector defined in Japan Industrial Standard (JIS) C 5981 (or, F15 type optical fiber connector defined in JIS C 5984.)

The directions will be defined as illustrated in the figures. To be specific, the direction in which the plurality of the optical fiber holes 12 (optical paths) are aligned (the direction in which the plurality of the optical fibers which configure the non-illustrated optical fiber ribbon are aligned) is defined as the "right-left direction". And the direction in which the guide pin holes 11 of the optical connector ferrule 1 extend is defined as the "front-rear direction", and the side of the non-illustrated other optical connector ferrule seen from the connecting endface is defined as the "front" and the opposite side thereof the "rear". Further, the direction which is perpendicular to the right-left direction as well as the front-rear direction is defined as the "up-down direction" and the side of the face where the adhesive filling opening 14 is provided is defined as "up" and the opposite side thereof "down". Here, the right-left direction may be also called the alignment direction.

<Basic Configuration>

The optical connector ferrule 1 (optical connector) is a member which holds the end portion of the optical fiber that transmits optical signals. The optical connector ferrule 1 includes a main body portion 10 and a reinforcing member 21. The shape and the dispositions of the reinforcing member 21 will be described later in detail.

The main body portion 10 configures the section of the optical connector ferrule 1 besides the reinforcing member 21. The front side endface of the main body portion 10 is the connecting endface which connects with another optical connector. The rear side of the main body portion 10 has formed thereto a brim portion 10A which protrudes out to the outer side from the outer circumferential face of the main body portion 10. The main body portion 10 which includes the brim portion 10A is integrally formed with resin. End portions of the plurality of the optical fibers would be held inside the main body portion 10.

The main body portion 10 includes two guide pin holes 11, a plurality of optical fiber holes 12, an adhesive filling portion 13, and an optical fiber insert hole 15.

The guide pin holes 11 are holes (guide portions) for having inserted therein guide pins of another optical connector. The positions of the optical connectors are aligned by inserting the guide pins into the guide pin holes 11. The guide pin holes 11 penetrate through the main body portion 10 in the front-rear direction and the two guide pin holes 11 are opened on the connecting endface of the optical connector ferrule 1. The two guide pin holes 11 are disposed to align in the front-rear direction and are formed with a space therebetween in the right-rear direction in a manner sandwiching the plurality of the optical fiber holes 12.

The optical fiber holes 12 are holes for having inserted therein the end portions of the optical fibers. The optical fiber holes 12 would have inserted therein bare fiber having the coatings stripped off from the optical fiber. Therefore, the optical fiber holes 12 become sections which form the optical paths inside the main body portion 10. The optical fiber holes 12 penetrate the optical connector ferrule 1 to extend between the connecting endface and the adhesive filling portion 13 (interior space), and the connecting side endface of the optical connector ferrule 1 has the plurality of the optical fiber holes 12 opened. The plurality of the optical fiber holes 12 extends parallel in the front-rear direction. The plurality of the optical fiber holes 12 which are parallel to each other would be aligned in the right-left direction.

The adhesive filling portion 13 is a cavity for filling therein adhesive. The optical fibers inserted from the optical fiber insert hole 15 would extend through the adhesive filling portion 13 to be inserted into the optical fiber holes 12. The top face of the optical connector ferrule 1 has formed thereto an adhesive filling opening 14 which is an opening of the adhesive filling portion 13. The end portions of the optical fibers are secured to the optical connector ferrule 1 by the adhesive that is filled into the adhesive filling portion 13 through this adhesive filling opening 14. A guiding groove 13A for supporting the optical fibers from below may be formed at the lower portion of the adhesive filling portion 13.

The optical fiber insert hole 15 is an insert hole for inserting optical fibers (optical fiber ribbon) into the optical connector ferrule 1. The optical fiber insert hole 15 extends to penetrate between the adhesive filling portion 13 and the rear side endface of the optical connector ferrule 1, and an optical fiber insert hole 15 is opened to the rear side endface of the optical connector ferrule 1.

<Reinforcing Member 21>

Figure 3:
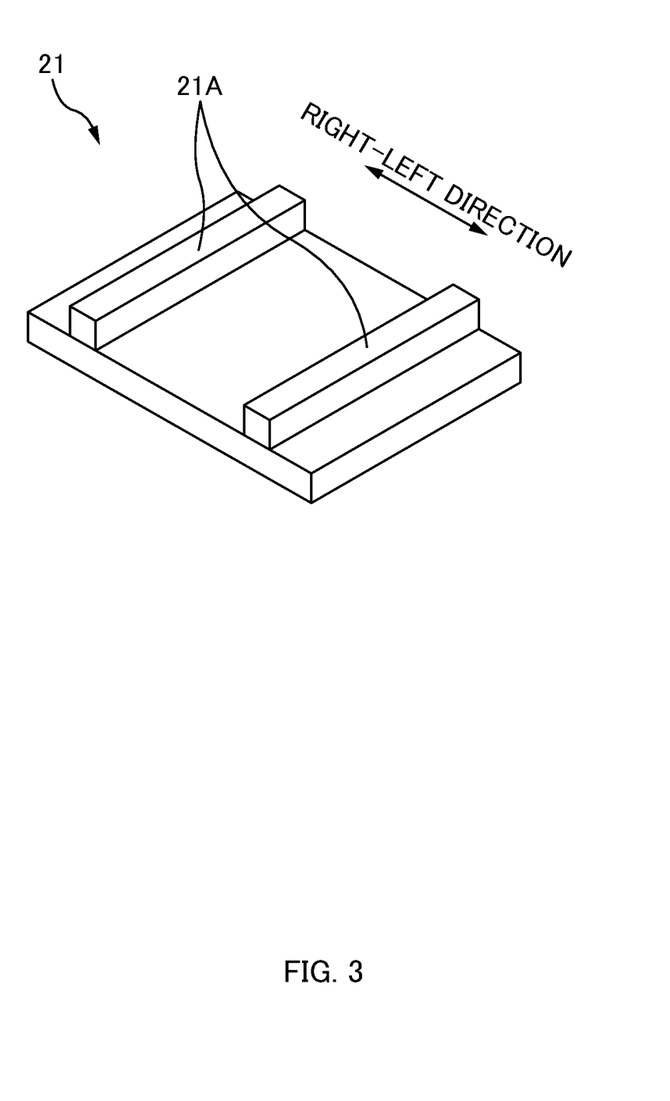
FIG. 3 is an explanatory diagram of a reinforcing member 21.

FIG. 3 is an explanatory diagram of the reinforcing member 21. Description of the reinforcing member 21 will be given in the following with reference to FIGS. 2A and 2B together with FIG. 3.

The reinforcing member 21 is a member with a linear expansion coefficient smaller than that of the main body portion 10, and is a member that suppresses the expansion and the contraction of the main body portion 10. Ceramic material such as zirconia, alumina and the like, metal material such as refractory metal and steel, glass, silicon and the like can be used as materials with linear expansion coefficients smaller than that of the resin configuring the main body portion 10.

The material properties of the reinforcing member 21 is preferably the same as the material properties of that to which the optical connector ferrule 1 is connected or a material property substantially equal to the linear expansion coefficient of that to which the optical connector ferrule 1 is connected. For example, the reinforcing member 21 is preferably configured with glass if the other end to which the optical connector ferrule 1 is connected is made of glass.

The reinforcing member 21 can be formed to be embedded (insert molding) in the main body portion 10 that is a resin molding by disposing the reinforcing member 21 inside the chamber of the mold during resin molding of the main body portion 10. Further, when the reinforcing member 21 is disposed at the outer face of the main body portion 10 as in the present embodiment, the reinforcing member 21 may be mounted after molding the main body portion 10.

The reinforcing member 21 is a planar member having a face parallel to the right-left direction (the alignment direction in which the plurality of the optical fiber holes 12 (optical paths) are arranged.) Here, the planar reinforcing member 21 is disposed parallel to also the front-rear direction (the direction in which the optical fiber holes 12 extend.) The optical connector ferrule 1 according to the present embodiment includes two reinforcing members 21 having disposed one at the top and the other at the bottom of the main body portion 10. The two planar reinforcing members 21 are disposed in a manner opposing each other sandwiching the plurality of the optical fiber holes 12 (optical paths.)

By the way, when the faces contacting between the reinforcing member 21 and the main body portion 10 are flat planes, there is a possibility for a separation between the reinforcing member 21 and the main body portion 10 to occur if the main body portion 10 expands or contracts. The reinforcing member 21 would not be able to suppress the expanding or the contracting of the main body portion 10 when the reinforcing member 21 and the main body portion 10 separate and as a result of this, a misalignment of the optical fiber holes 12 would occur causing a possibility in increase in transmission loss. Therefore, the present embodiment has formed two limiting portions 21A along the right-left direction with a space therebetween, on the optical path side face of the reinforcing member 21, the two limiting portions 21A limiting the expansion and the contraction of the main body portion 10 in the right-left direction.

The reinforcing member 21 has two projections that are the limiting portions 21A on the optical fiber hole 12 side face. The projections are protruding portions which protrude out from the face on the optical fiber hole 12 side and are protruding portions arranged parallel to the front-rear direction (the direction perpendicular to the right-left direction in which the plurality of the optical fiber holes 12 are aligned.) Here, the two projections are disposed along the right-left direction with a space therebetween. The reinforcing member 21 disposed on the upper side has two projections on the lower face thereof. Further, the reinforcing member 21 disposed on the lower side has two projection on the upper face thereof. In this way, the two reinforcing members 21 have disposed the faces having the projections opposing each other.

The projection that is the limiting portion 21A has a face which limits the expansion and the contraction along the right-left direction of the main body portion 10. When the main body portion 10 attempts to expand due to temperature changes, the inner side faces of the two projections hold from the right and left directions the main body portion 10 and suppresses the expansion of the main body portion 10 along the right-left direction. On the other hand, when the main body portion 10 attempts to contract due to temperature changes, the outer side faces of the two projections hold from the right and left directions the main body portion 10 and suppresses the contraction of the main body portion 10 along the right-left direction. In this way, the projections that are the limiting portions 21A perform functions as wedges which suppress the expansion and the contraction of the main body portion 10.

In the present embodiment, the reinforcing member 21 with a small linear expansion coefficient can suppress the expansion and the contraction of the main body portion 10 in the right-left direction due to temperature changes by including two projections (limiting portions 21A) with a space therebetween in the right-left direction. In addition, the projections of the reinforcing member 21 that are formed on the face on the optical fiber hole 12 side can particularly suppress the misalignment of the optical fiber holes 12 in the right-left direction. Hereby, the optical axes can be suppressed from being displaced at the connecting endface due to temperature changes and in turn enables to suppress increase in transmission loss due to the temperature changes.

Here, the optical connector ferrule 1 according to the present embodiment includes two reinforcing members 21, however, the expansion and the contraction of the main body portion 10 in the right-left direction due to temperature changes can be suppressed even when the number of the reinforcing member 21 is one. However, when the number of the reinforcing member 21 is one, there is a possibility that curving of the main body portion 10 due to temperature changes may occur. Meanwhile, the present embodiment has two reinforcing members 21 disposed opposing each other while sandwiching the plurality of the optical fiber holes 12 (optical paths.) Hereby, curving of the main body portion 10 due to temperature changes can be suppressed and in turn enables to suppress increase in transmission loss due to the temperature changes.

As illustrated in FIG. 2A, the space W1 in the right-left direction between the two projections of the reinforcing member 21 in the present embodiment is wider than the width W2 of the plurality of the optical fiber holes 12 in the right-left direction (e.g., the two projections of the reinforcing member 21 are disposed with a space W1 therebetween which is wider than the width W2 of the plurality of the optical fiber holes 12 in the right-left direction.) And the two projections of the reinforcing member 21 are disposed on the outer side, in the right-left direction, with respect to the plurality of the optical fiber holes 12. The positions of the outer side optical fiber holes 12 may be displaced in the right-left direction due to temperature changes if the optical fiber holes 12 are disposed on the outer side, in the right-left direction, with respect to the two projections of the reinforcing member 21, however, such misalignment can be suppressed in the present embodiment.

Further in the present embodiment, the two projections of the reinforcing member 21 are disposed at locations which are right-left symmetry with respect to the center of the plurality of the optical fiber holes 12 (optical paths.) Hereby, misalignment of the optical fiber holes 12 in the right-left direction can be further suppressed even when the main body portion 10 should expand or contract due to temperature changes.

In the present embodiment, as illustrated in FIG. 2B, the front ends of the reinforcing members 21 reach the connecting endface of the optical connector ferrule 1. Hereby, misalignment of the optical fiber holes 12 at the connecting endface can be suppressed easily. However, the front ends of the reinforcing members 21 may be located on the rear side of the connecting endface of the optical connector ferrule 1. Hereby, processes of grinding and the like of the connecting endface of the optical connector ferrule 1 can be performed easily.

MODIFIED EXAMPLES

Figure 4A:
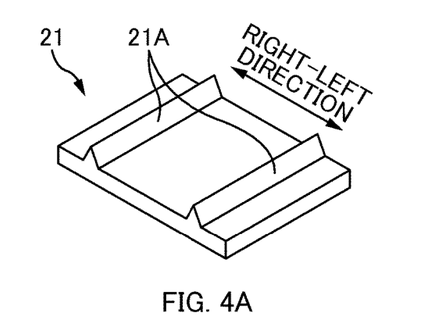
FIG. 4A to FIG. 4F are explanatory diagrams of modified examples of the limiting portion 21A.
Figure 4B:
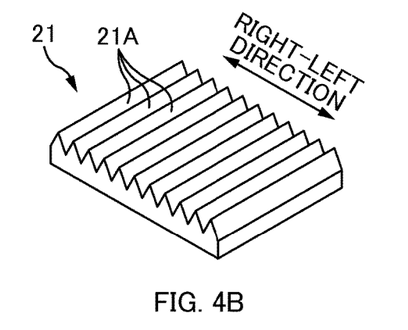

The aforementioned limiting portion 21A was a projection with a rectangular cross-section, however, the limiting portion 21A may be a projection with a triangular cross-section, as illustrated in FIG. 4A. However, a projection with a rectangular cross-section (see FIG. 3) allows easier suppression of the expansion and the contraction of the main body portion 10 in the right-left direction than the projection illustrated in FIG. 4A since the faces that limit the expansion and the contraction of the main body portion 10 along the right-left direction are perpendicular to the right-left direction. Here when the faces which limit the expansion and the contraction of the main body portion 10 along the right-left direction are inclined, as illustrated in FIG. 4B, the number of the limiting portions 21A aligned in the right-left direction is preferably two or more.

Figure 4C:
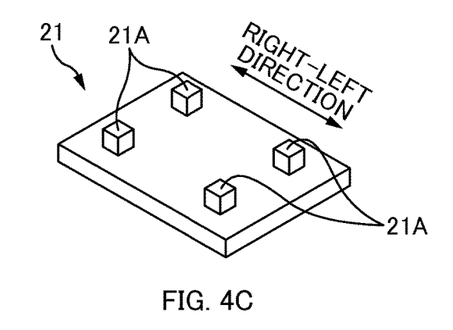
Figure 4D:
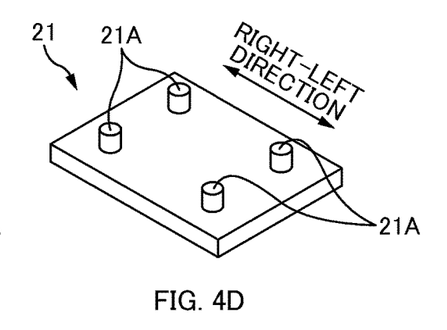
Figure 4E:
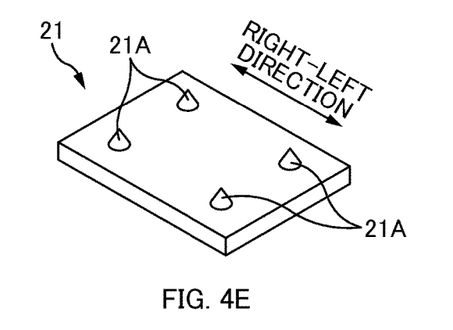

The limiting portion 21A is not limited to a projection (a protruding portion extending in a predetermined direction.) For example as illustrated in FIGS. 4C to 4E, the limiting portion 21A may be a protruding portion in a pin shape. Specifically, the limiting portion 21A in a pin shape may be a protruding portion in a rectangular column shape as illustrated in FIG. 4C, a protruding portion in a circular column shape as illustrated in FIG. 4D, a protruding portion in a circular cone shape as illustrated in FIG. 4E, and a protruding portion in any other shape (such as a pyramidal shape.) In the cases illustrated in FIGS. 4C to 4E also have the faces facing toward the inner side of the two protruding portions (limiting portion 21A) disposed in the right-left direction with a space therebetween being enabled to suppress the expansion along the right-left direction of the main body portion 10 and the faces facing toward the outer side (outer sides along the right-left direction) of the two protruding portions being enabled to suppress the contraction along the right-left direction of the main body portion 10.

Here, the number of the protruding portions aligned in the right-left direction may be two or more when the limiting portions 21A are protruding portions in pin shapes.

Figure 4F:
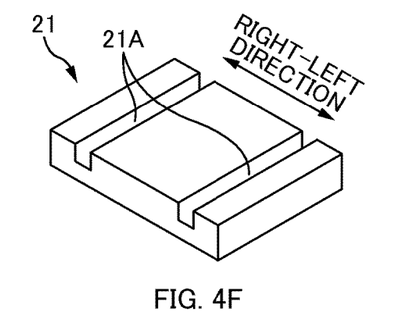

The limiting portion 21A is not limited to a protruding portion. For example, as illustrated in FIG. 4F, the limiting portion 21A may be a recessed portion (recessed groove.) In this case also, the faces, of the two recessed grooves, facing the inner sides can suppress the expansion of the main body portion 10 along the right-left direction and the faces, of the two recessed grooves, facing the outer sides can suppress the contraction of the main body portion 10 along the right-left direction. Here, a recessed portion in a pin hole form may be used as the limiting portion 21A instead of a recessed groove (groove section extending in a predetermined direction.) However, the limiting portion 21A is preferably formed as a protruding portion since the reinforcing member 21 would become thick (see FIG. 4F) when the limiting portion 21A is made as a recessed section.

Figure 5:
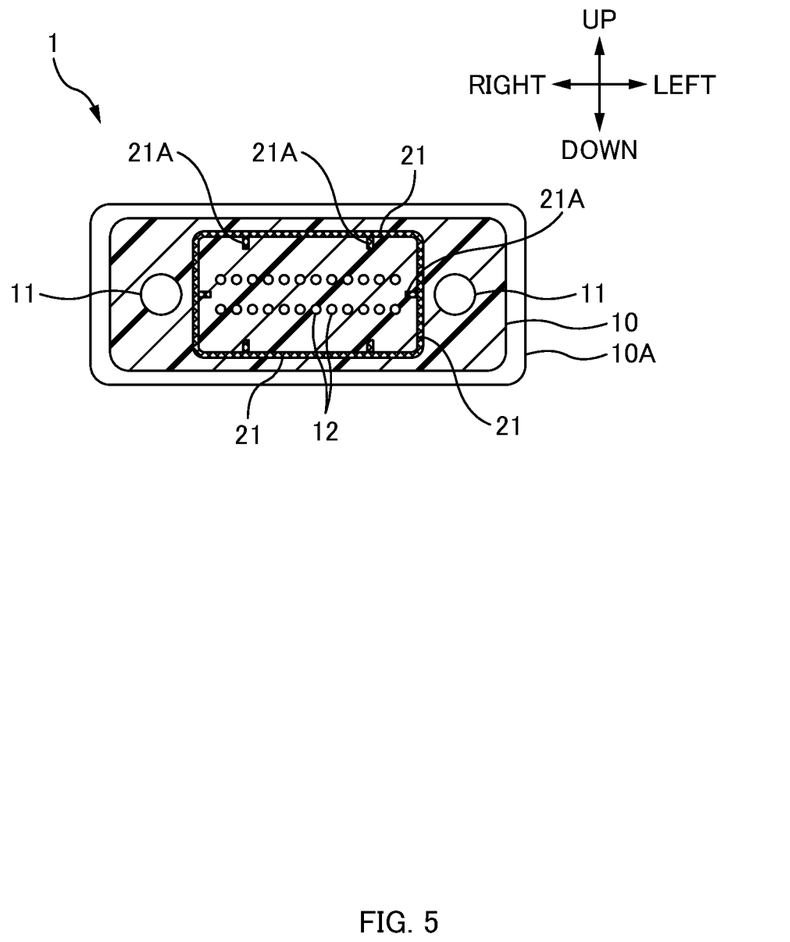
FIG. 5 is an explanatory diagram of a modified example of the reinforcing member 21.

FIG. 5 is an explanatory diagram of a modified example of the reinforcing member 21. In also this modified example, a rectangular tubular member is configured with four reinforcing members 21. And also in this modified example, the reinforcing members 21 opposing each other in the up-down direction each has a face parallel to the right-left direction (the alignment direction in which the plurality of the optical paths are arranged) and include two projections (limiting portions 21A), in the right-left direction, on the optical path side face with a space there between. Hereby, expansion and the contraction of the main body portion 10 in the right-left direction due to temperature changes can be suppressed.

Further, in this modified example, the optical fiber holes 12 are configured in two rows. As in this modified example, the number of rows of the plurality of the optical fiber holes 12 aligned in the right-left direction may be two or more. As illustrated in FIG. 5, when the rows of the plurality of the optical fiber holes 12 are disposed one over the other, a limiting portion 21A is preferably formed to also the faces, parallel to the up-down direction, of the reinforcing members 21 (reinforcing members 21 opposing in the right-left direction.) Hereby, expansion and the contraction along the up-down direction of the main body portion 10 can be suppressed and in turn enables to suppress misalignment of the optical fiber holes 12 in the up-down direction.

Second Embodiment

Figure 6:
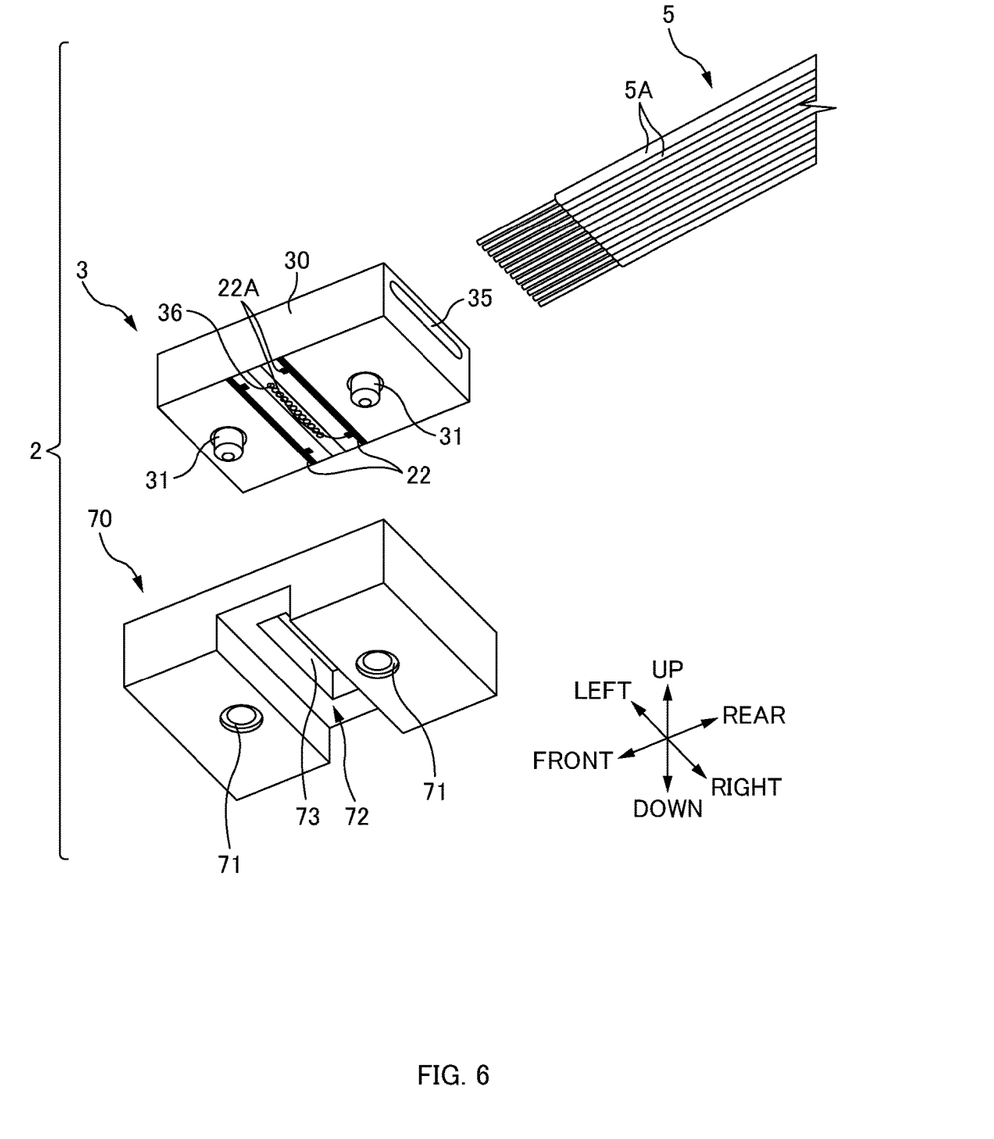
FIG. 6 is an exploded perspective view of an optical connector 2 according to a second embodiment.
Figure 7:
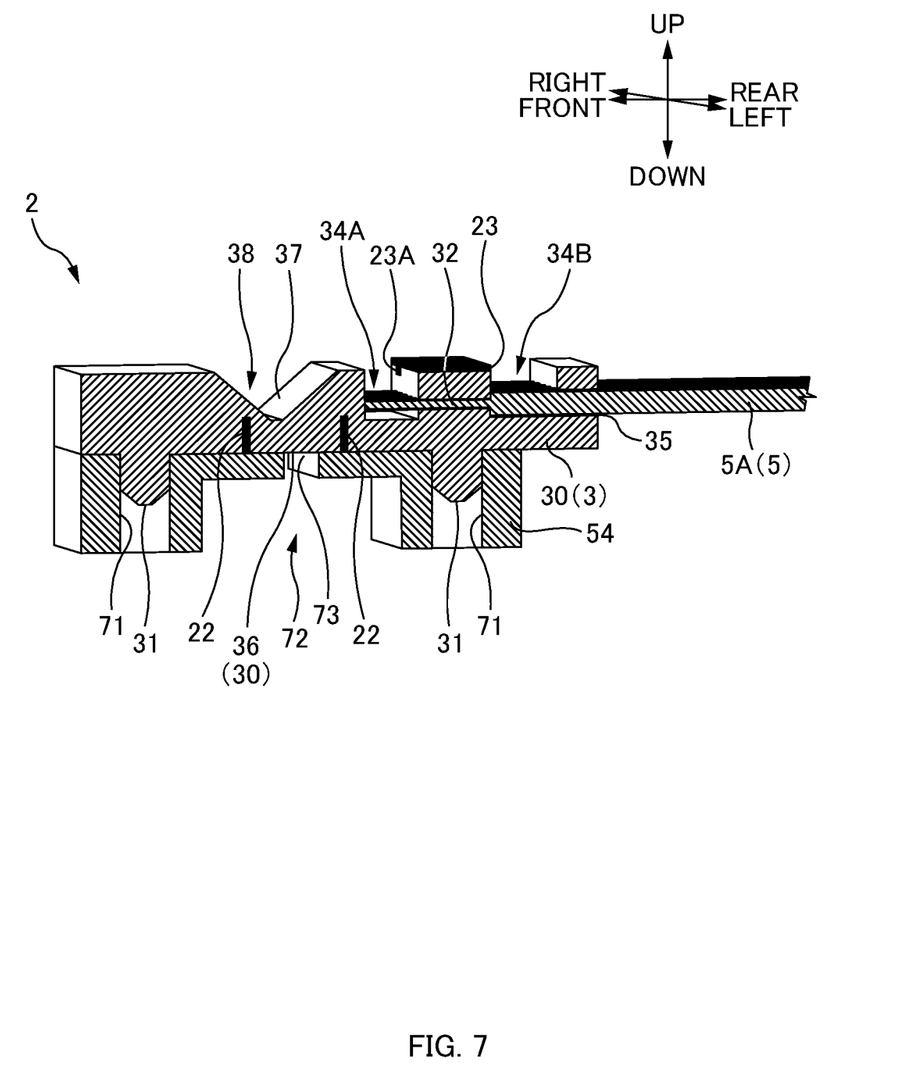
FIG. 7 is a sectional view describing the optical connector 2 according to the second embodiment.

FIG. 6 is an exploded perspective view of an optical connector 2 according to the second embodiment. FIG. 7 is a sectional view describing the optical connector 2 according to the second embodiment.

The directions will be defined as illustrated in FIG. 7. To be specific, the direction in which the plurality of the optical paths are aligned (the direction in which the plurality of the optical fibers 5A of the optical fiber 5 are aligned) in the optical connector ferrule 3 is defined as the "right-left direction". And the direction in which the guide pins 31 of the optical connector ferrule 3 extend are defined as the "up-down direction", and the side of the receptacle 70 seen from the optical connector ferrule 3 is defined as "down" and the opposite side thereof "up". Further, the direction which is perpendicular to the right-left direction as well as the up-down direction is defined as the "front-rear direction" and the side to which the optical fibers 5A extend out from the optical connector ferrule 3 is defined as the "rear" and the opposite side thereof the "front".

<Basic Configuration>

The optical connector 2 includes an optical connector ferrule 3 and a receptacle 70.

Optical Connector Ferrule 3

The optical connector ferrule 3 is a member which holds the end portions of the optical fibers 5A which transmit optical signals. The optical connector ferrule 3 includes a main body portion 30 and a reinforcing member (first reinforcing member 22 and second reinforcing member 23.) The shapes and dispositions of the reinforcing members will be described later in detail The main body portion 30 configures the section of the optical connector ferrule 3 besides the reinforcing member. The main body portion 30 has two guide pins 31, a plurality of optical fiber holes 32, a first adhesive filling section 34A, a second adhesive filling section 34B, an optical fiber insert hole 35, an optical signal plane 36 and a reflecting face 37. The main body portion 30 including these sections is integrally formed with transparent resin which allows optical signals to pass therethrough. Therefore, the choices from which the material of the main body portion 30 can be selected are few therefore the main body portion 30 may be formed with a material with a relatively large linear expansion coefficient.

The guide pins 31 are pins (guide portions) for inserting into the guide holes of the receptacle 70. The positions of the optical connector ferrule 3 and the receptacle 70 are aligned by inserting the guide pins 31 of the optical connector ferrule 3 into the guide pin holes 71 of the receptacle 70. The guide pins 31 protrude out from the lower face of the optical connector ferrule 3. The two guide pins 31 are parallel in the up-down direction (the direction perpendicular to the optical signal face 36) and are formed aligned in the front-rear direction.

The optical fiber holes 32 are holes for having the end portions of the optical fibers 5A inserted. The optical fiber holes 32 would have inserted bare fiber having the coatings stripped off from the optical fiber core wire. Therefore, the optical fiber holes 32 become sections which form the optical paths inside the main body portion 30. The optical fiber holes 32 penetrate to extend between the first adhesive filling portion 34A and the second adhesive filling portion 34B. The positions of the optical fibers 5A are aligned with the optical connector ferrule 3 by the optical fibers 5A being inserted into the optical fiber holes 32 until the endfaces of the optical fibers 5A abut against the front wall on the front side of the first adhesive filling portion34A. The plurality of the optical fiber holes 32 are formed to be arranged along the right-left direction. The plurality of the optical fiber holes 32 parallel to each other are arranged in the right-left direction.

The first adhesive filling portion 34A and the second adhesive filling portion 34B are cavities for having adhesives filled therein. The first adhesive filling portion 34A is a cavity for applying adhesive to the end portions of the optical fibers 5A projecting out from the optical fiber hole 32. The second adhesive filling portion 34B is a cavity for applying adhesive to the optical fiber ribbon 5 at the rear side with respect to the optical fiber holes 32.

The optical fiber insert hole 35 is an insert hole for inserting the optical fibers 5A (optical fiber ribbon 5) through the optical connector ferrule 3. The optical fiber insert hole 35 penetrates to extend between the rear side endface of the optical connector ferrule 3 and the second adhesive filling portion 34B and the optical fiber insert hole 35 is opened at the rear side endface of the optical connector ferrule 3.

The optical signal plane 36 is a plane which has optical signals enter therein or exit out therefrom and is formed on the lower face of the optical connector ferrule 3. The optical signal plane 36 would have a plurality of optical signals entering therein or exiting therefrom. The optical signal plane 36 of the optical connector ferrule 3 opposes the opened portion 73 of the receptacle 70 and also opposes the top face (the face which has optical signals entering therein or exiting therefrom) of the non-illustrated device accommodated in the device accommodating portion 72 of the receptacle 70 when the position of the optical connector ferrule 3 is aligned with the receptacle 70. The optical signal plane 36 is formed parallel to the right-left direction (the alignment direction in which the plurality of the optical fibers 5A is arranged.) Further, the optical signal plane 36 is disposed between the two guide pins 31. Furthermore, lenses are formed to the optical signal plane 36, along the right-left direction. The lenses of the optical signal plane 36 are disposed on the optical paths. Here, the optical signal plane 36 may be flat without disposing the lenses to the optical signal plane 36.

The reflecting face 37 is a plane which reflects optical signals. The inclined end plane on the front side of the front wall which positions the endfaces of the optical fibers 5A acts as the reflecting face 37. A depressed portion 38 is formed on the top face of the optical connector ferrule 3 and the inclined end plane on the rear side of the depressed portion 38 becomes the reflecting face 37. The reflecting face 37 is a boundary plane between the atmosphere and the resin which configures the optical connector ferrule 3 and light is reflected on the boundary plane between the two with a refractive index difference between the two. The reflecting face 37 is formed parallel along the right-left direction (the alignment direction in which the plurality of the optical fibers 5A is arranged.) The reflecting face 37 may be a flat plane or a lens plane (curved plane.)

The optical signals which pass through the main body portion 30 would be reflected by the reflecting face 37. The optical signals would be reflected by the reflecting face 37 and exit from the optical signal plane 36 toward the opened portion 73 of the receptacle 70 when the optical signals exit from the endfaces of the optical fibers 5A. Further, the optical signals would be reflected by the reflecting face 37 to enter into the endfaces of the optical fibers 5A when the optical signals enter from the opened portion 73 of the receptacle 70 and into the optical signal plane 36. The optical paths in the main body portion 30 are refracted by the reflecting face 37 to have the plurality of refracted optical paths aligned in the right-left direction. The optical paths in the main body portion 30 are the section (section parallel to the right-left direction and the up-down direction) between the optical signal plane 36 and the reflecting face 37 through which the optical signals pass and the section (section parallel to the right-left direction and the optical fibers 5A) between the reflecting face 37 and the endfaces of the optical fibers 5A through which the optical signals pass.

Here, the optical paths between the optical signal plane 36 and the reflecting face 37 are parallel (parallel to the up-down direction) to the optical axis of a non-illustrated device accommodated in the device accommodating portion 72 of the receptacle 70, and the optical paths between the reflecting face 37 and the endfaces of the optical fibers 5A are parallel to the optical paths of the optical fibers 5A. The optical path between the reflecting face 37 and the endfaces of the optical fibers 5A is in a direction intersecting the optical path between the optical signal plane 36 and the reflecting face 37 since the optical paths are refracted by the reflecting face 37. Here the optical paths between the reflecting face 37 and the endfaces of the optical fibers 5A are orthogonal to the optical paths between the optical signal plane 36 and the reflecting face 37 but may be disposed inclined and not orthogonal thereto. The optical connector ferrule functions as an optical path converter by including the reflecting face.

Receptacle 70

The receptacle 70 is a member (connecting member) used for aligning the position of the optical connector ferrule 3 with the non-illustrated circuit board. The receptacle 70 includes two guide pin holes 71, a device accommodating portion 72 and an opened portion 73.

The guide pin holes 71 are holes for having inserted the guide pins 31. The guide pin holes 71 penetrate through the receptacle 70 in the up-down direction and the two guide pin holes 71 are opened to the top face of the receptacle 70. The two guide pin holes 71 are disposed to align in the front-rear direction and are formed to align in the front-rear direction in a manner sandwiching the optical signal plane 36.

The device accommodating portion 72 is a section which accommodates the non-illustrated device disposed on the non-illustrated circuit board. The circuit board has disposed thereon, for example, an optical/electrical converter such as a light-emitting device and/or a light-receiving device or an optical device such as a lens array, and such a device would be disposed in the device accommodating portion 72 of the receptacle 70. Here, the top face of the device that is accommodated in the device accommodating portion 72 is a plane into which optical signals enter or exit therefrom.

The opened portion 73 is an opening for allowing optical signals pass therethrough and is formed at the top portion of the device accommodating portion 72. The opened portion 73 is positioned between the optical signal plane 36 of the optical connector ferrule 3 and the top face (particularly the plane into which optical signals enter or exit therefrom) of the device in the device accommodating portion 72. In other words, the upper side of the opened portion 73 opposes the optical signal plane 36 of the optical connector ferrule 3 and the lower side of the opened portion 73 opposes the plane, of the device in the device accommodating portion 72, into which the optical signals enter or exit therefrom. The opened portion 73 is an elongated opening extending in the right-left direction (the alignment direction in which the plurality of the optical fibers 5A is arranged.)

<Reinforcing Member>

As illustrated in FIG. 7, the optical connector ferrule 3 has a first reinforcing member 22 and a second reinforcing member 23 as the reinforcing member. Here, the optical connector ferrule 3 may include only one of the first reinforcing member 22 and the second reinforcing member 23.

The first reinforcing member 22 and the second reinforcing member 23 are members having linear expansion coefficients smaller than that of the main body portion 30 and are members that suppress the expansion and the contraction of the main body portion 30. The first reinforcing member 22 is preferably configured with silicon when the optical/electrical converter (light-emitting device or light-receiving device) formed with a silicon substrate is accommodated in the device accommodating portion 72 of the receptacle 70.

The first reinforcing member 22 and the second reinforcing member 23 are planar members which have planes parallel to the right-left direction (the alignment direction in which the plurality of the optical paths are arranged.) The first reinforcing member 22 is disposed also parallel to the up-down direction (the direction in which the optical signals enter into or exit from the optical signal plane 36.) The second reinforcing member 23 is disposed parallel to the optical fiber holes 32.

The first reinforcing member 22 is configured with two reinforcing members, as illustrated in FIG. 6 and FIG. 7. The two reinforcing members which configure the first reinforcing member 22 are disposed in a manner opposing each other sandwiching the optical signal plane 36 when the optical connector ferrule 3 is seen from below, as illustrated in FIG. 6. Further, the two reinforcing members which configure the first reinforcing member 22 are disposed in a manner opposing each other sandwiching the optical paths between the optical signal plane 36 and the reflecting face 37, as illustrated in FIG. 7. In other words, the two reinforcing members which configure the first reinforcing member 22 are disposed in a manner sandwiching the section (the section parallel to the right-left direction as well as the up-down direction) which act as the optical paths between the optical signal plane 36 and the reflecting face 37.

The first reinforcing member 22 includes two projections which act as the limiting portions 22A, as illustrated in FIG. 6. The projections are protruding portions which are protruding out from the optical path (section between the optical signal plane 36 and the reflecting face 37 through which optical signals pass) side face and are protruding portions formed along the up-down direction parallel to the optical paths between the optical signal plane 36 and the reflecting face 37. The two projections are disposed along the right-left direction with a space therebetween (see FIG. 6.) Here, as has been described, protruding portions with triangular cross-sections, protruding portions in pin shapes or recessed portions may be used instead of the projections with rectangular cross-sections and the number of the projections may be more than one.

In also the second embodiment, the expansion and the contraction of the main body portion 30 in the right-left direction due to temperature changes may be suppressed by the first reinforcing member 22 with a small linear expansion coefficient including two projections (limiting portions 22A) arranged in the right-left direction with a space therebetween. In addition, the misalignments, in the right-left direction, of the optical signals entering into or exiting out from the optical signal plane 36 can be particularly suppressed since the projections of the first reinforcing member 22 are formed on the optical path side face. Hereby, the optical axes that are displaced at the optical signal plane 36 due to temperature changes can be suppressed and in turn enables to suppress increase in transmission loss due to the temperature changes.

Two planar reinforcing members configure the first reinforcing member 22, however, the expansion and the contraction of the main body portion 30 in the right-left direction due to temperature changes may be suppressed even when a single reinforcing member configures the first reinforcing member 22. But in this case, there is a possibility that curving of the main body portion 30 may occur due to temperature changes. Meanwhile in the second embodiment, the two planar reinforcing members configuring the first reinforcing member 22 are disposed to oppose each other in a manner sandwiching the optical paths. Hereby, curving of the main body portion 30 due to temperature changes can be suppressed and in turn enables to suppress increase in transmission loss due to the temperature changes.

The second reinforcing member 23 is disposed parallel to the plurality of the optical fiber holes 32 (optical paths) aligned in the right-left direction, as illustrated in FIG. 7. The second reinforcing member 23 has formed two projections (only one is indicated in FIG. 7) as the limiting portions 23A on the optical fiber hole 32 side face and the two projections are disposed in the right-left direction with a space therebetween. Hereby, displacement of the optical axes due to temperature changes can be suppressed and in turn enables to suppress increase in transmission loss due to the temperature changes. In the second embodiment illustrated in FIG. 7, the second reinforcing member 23 is configured with a single planar reinforcing member, however, two reinforcing members may configure the second reinforcing member 23 with the two reinforcing members opposing each other being disposed in a manner sandwiching the optical paths.

Third Embodiment

The aforementioned reinforcing members in the first and the second embodiments were planar members parallel to the right-left direction (the alignment direction in which the plurality of the optical paths is arranged) as well as parallel to the optical paths. However, the reinforcing members just need to be parallel to the right-left direction (the alignment direction in which the plurality of the optical paths is arranged) and may have a plane which intersects the optical paths.

Figure 8A:
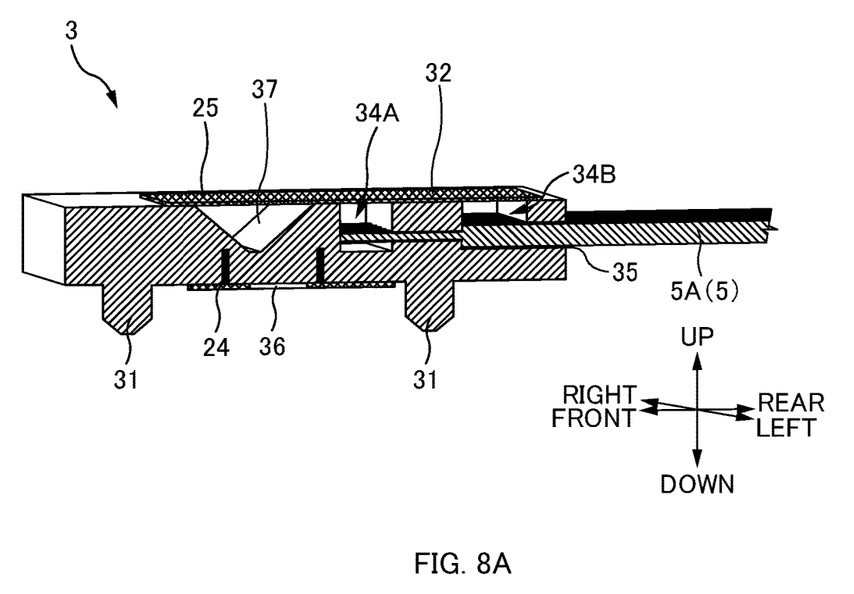
FIG. 8A is a sectional view describing the optical connector ferrule 3 according to a third embodiment and FIG. 8B is a perspective view of the optical connector ferrule 3 according to the third embodiment seen from below.
Figure 8B:
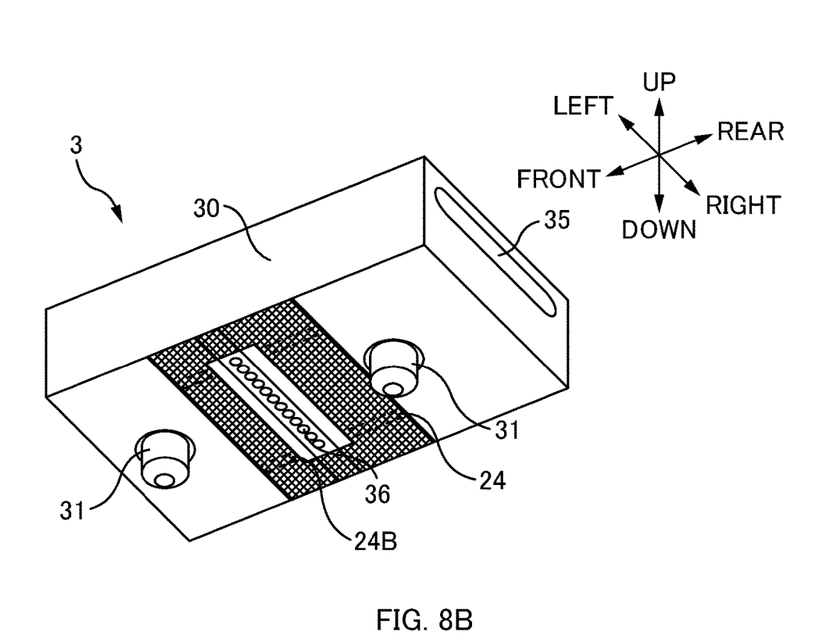
Figure 9A:
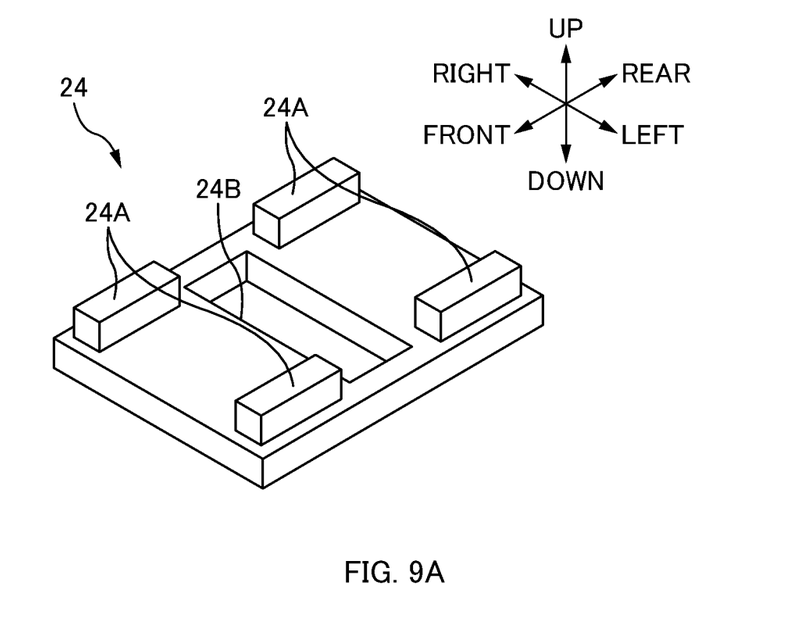
FIG. 9A is a perspective view of the lower side reinforcing member 24 of the optical connector ferrule 3 according to the third embodiment seen from above and FIG. 9B is a perspective view of a modified example of the lower side reinforcing member 24.

FIG. 8A is a sectional view describing the optical connector ferrule 3 according to a third embodiment. FIG. 8B is a perspective view of the optical connector ferrule 3 according to the third embodiment seen from below. FIG. 9A is a perspective view of the lower side reinforcing member 24 of the optical connector ferrule 3 according to the third embodiment seen from above The optical connector 2 according to the third embodiment includes the optical connector ferrule 3 as well as the receptacle 70 illustrated in FIGS. 8A and 8B. The configuration of the receptacle 70 is the same as that in the second embodiment.

The optical connector ferrule 3 has a main body portion 30, a lower side reinforcing member 24 and an upper side reinforcing member 25 that are the reinforcing member. The main body portion 30, similar to the second embodiment, configures the section of the optical connector ferrule 3 besides the reinforcing member, and has two guide pins 31, a plurality of the optical fiber holes 32, a first adhesive filling portion 34A, a second adhesive filling portion 34B, an optical fiber insert hole 35, an optical signal plane 36 and a reflecting face 37.

The lower side reinforcing member 24 and the upper side reinforcing member 25 are planar members having linear expansion coefficients which are smaller than that of the main body portion 30, and are members which suppress the expansion and the contraction of the main body portion 30.

The lower side reinforcing member 24 and the upper side reinforcing member 25 are planar members parallel to the right-left direction (the alignment direction in which the plurality of the optical paths is arranged.) The upper side reinforcing member 25 is disposed on the top face of the optical connector ferrule 3 and is also disposed parallel to the optical fiber holes 32 (optical paths.) On the other hand, the lower side reinforcing member 24 is disposed on the lower face of the optical connector ferrule 3 and is a planar member perpendicular to the optical signals which enter into or exit from the optical signal plane 36. In other words, the first reinforcing member 22 according to the second embodiment was a planar member parallel to the optical paths at the optical signal plane 36 whereas the lower side reinforcing member 24 according to the third embodiment is a planar member which is perpendicular to the optical paths at the optical signal plane 36.

The lower side reinforcing member 24 has a light passing opening 24B. The light passing opening 24B is a opening which allows optical signals to pass therethrough and is opened along the right-left direction. The light passing opening 24B is disposed at a location opposing the optical signal plane 36 of the main body portion 30. The lower side reinforcing member 24 is allowed to be disposed to intersect with the optical paths by the lower side reinforcing member 24 having the light passing opening 24B.

Figure 9B:
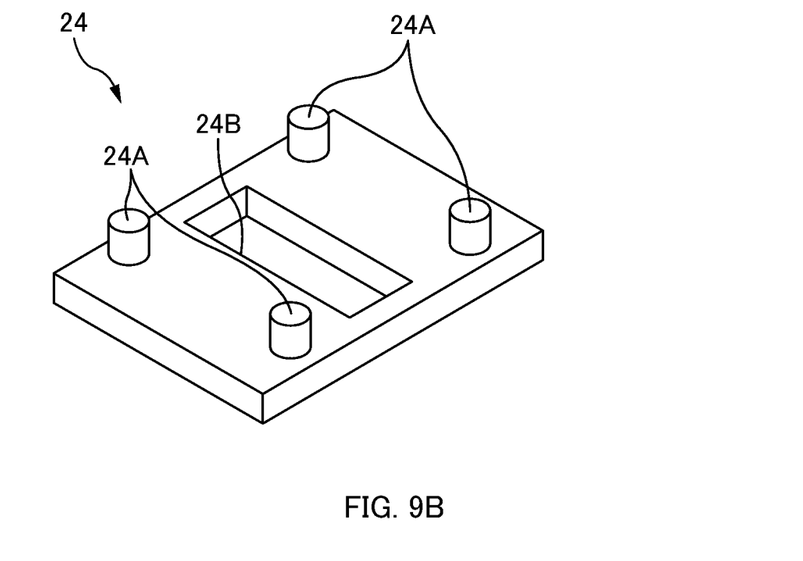

The lower side reinforcing member 24 has two projections which act as the limiting portions 24A on the top face (face on the optical path side in the main body portion 30) thereof. The projections are protruding portions which protrude upward from the top face and are protruding portions which are parallel to the front-rear direction. Although non-illustrated, the upper side reinforcing member 25 has two projections acting as the limiting portions 24A on the lower side thereof. The upper side reinforcing member 25 and the lower side reinforcing member 24 are disposed to have the faces having the projections oppose each other. Here, as has been described, protruding portions with triangular cross-sections, protruding portions in pin shapes or recessed portions may be used instead of the projections with rectangular cross-sections as illustrated in FIG. 9A and the number of the projections may be more than one. As illustrated in FIG. 9B, the limiting portions 24A may be protruding portions in cylindrical pin shapes.

In also the third embodiment, the lower side reinforcing member 24, with a small linear expansion coefficient, including two projections (limiting portions 24A) along the right-left direction with a space therebetween allows to suppress the expansion and the contraction of the main body portion 30 in the right-left direction due to temperature changes. Additionally, the projections of the lower side reinforcing member 24 that is formed to the top face (optical path side face) allows to particularly suppress misalignment of the optical signals entering or exiting the optical signal plane 36 in the right-left direction. Hereby, the optical axes can be suppressed from being displaced at the optical signal plane 36 due to temperature changes and in turn enables to suppress increase in transmission loss due to the temperature changes.

Further in also the third embodiment, the upper side reinforcing member 25 and the lower side reinforcing member 24 are disposed in a manner opposing each other sandwiching in the up-down direction the main body portion 30. Hereby, the optical paths in the main body portion 30 are disposed between the upper side reinforcing member 25 and the lower side reinforcing member 24. And hereby, the main body portion 30 is suppressed from curving. It should be noted that the optical connector ferrule 3 may include only one of the lower side reinforcing member 24 and the upper side reinforcing member 25.

Others

The above described embodiments are simply for facilitating the understanding of the present invention and are not in any way to be construed as limiting the present invention. Needless to say, the present invention may variously be changed or altered without departing from its spirit and encompass equivalents thereof.

What is claimed is:

1. An optical connector ferrule comprising:
   a main body portion having inside a plurality of optical paths parallel that are to each other; and
   a reinforcing member having a face parallel to an alignment direction of the plurality of the optical paths and having a linear expansion coefficient that is smaller than the linear expansion coefficient of the main body portion, wherein
   the reinforcing member has on a face of the optical path side thereof at least two limiting portions each having a face that limits an expansion and a contraction of the main body portion in the alignment direction, the limiting portions being spaced apart in the alignment direction.

2. The optical connector ferrule according to claim 1 further including two of the reinforcing members, wherein the two reinforcing members are disposed opposing each other and sandwiching the plurality of the optical paths.

3. The optical connector ferrule according to claim 1, wherein
   the two limiting portions of the reinforcing member are disposed, on an outer side along the alignment direction with respect to the plurality of the optical paths, and are spaced apart with a space wider than a width of the plurality of the optical paths in the alignment direction.

4. The optical connector ferrule according to claim 1, wherein the limiting portion is a protruding portion that is protruding out from the face on the optical path side of the reinforcing member.

5. The optical connector ferrule according to claim 1, wherein the optical path is an optical fiber hole that has optical fiber inserted.

6. The optical connector ferrule according to claim 1, wherein the optical path is a section that has optical signals pass therethrough in the main body portion.

* * * * *